US005713749A

United States Patent [19]
Wu

[11] Patent Number: 5,713,749
[45] Date of Patent: Feb. 3, 1998

[54] MULTI-FUNCTIONAL CHARGING DEVICE

[75] Inventor: Michael Wu, Taipei Hsien, Taiwan

[73] Assignee: Formosa Electronic Industries, Inc., Taipei Hsien, Taiwan

[21] Appl. No.: 721,323

[22] Filed: Sep. 26, 1996

[51] Int. Cl.$^6$ .................................................. H01R 13/44
[52] U.S. Cl. ........................ 439/131; 439/518; 439/956
[58] Field of Search ................................ 439/131, 170, 439/171, 172, 956, 518

[56] References Cited

U.S. PATENT DOCUMENTS

| | | | |
|---|---|---|---|
| 4,543,624 | 9/1985 | Rumble | 439/518 |
| 4,973,827 | 11/1990 | Nozaki | 439/172 |
| 4,997,381 | 3/1991 | Oh | 439/131 |
| 5,616,051 | 4/1997 | Rogers et al. | 439/171 |

*Primary Examiner*—Neil Abrams
*Assistant Examiner*—T. C. Patel
*Attorney, Agent, or Firm*—Beveridge, DeGrandi, Weilacher & Young, LLP

[57] ABSTRACT

A multi-functional charging device generally includes a housing having a lower housing and an upper housing. An electronic switching circuit is disposed within the housing. The lower housing is provided with an opening which has an inner housing socket attached to it. A pair of conducting plates in contact with the electronic switching circuit are attached to the inner housing socket. The inner housing socket is provided with a sliding socket and a coil spring is disposed between a sliding socket and the inner housing socket. The sides of the inner housing socket have a half shaft seat. The sides of the opening of the lower housing have a circular cutout. A pivoting hole is formed by the combination of the half shaft seat, the circular cutout and the circular shaft seat. A changeable plug can be received and installed within the pivoting hole. The changeable plug features a conducting terminal which can be contacted with the conducting plates when the plug is extended. The plug can be readily removed therefrom when the half shaft seat is separated from the circular cutout and the circular shaft seat. Another plug to match the particular specifications can be readily installed.

1 Claim, 4 Drawing Sheets

MULTI-FUNCTIONAL CHARGING DEVICE

FIELD OF THE INVENTION

The present invention relates to a charging device, more particularly, to a multi-functional charging device which is incorporated with a plug which can be readily adapted for different socket. On the other hand, an electronic circuit is incorporated to transform different voltage into usable voltage for different appliances.

BACKGROUND OF THE INVENTION

There are a plurality of portable electronic devices which are indispensable to our modern life, such as the mobile phone, the shaver, the portable cassette recorder, . . . etc. Each of these electronic devices is provided with a rechargeable battery which can be only used together with its designated charging device. When the user is traveling on business, he may also bring these electronics about-these electronic to make the business and all things run smoothly. Nevertheless, each country has their own power supply specification, consequently, even the plug/socket may also be different from country to country. Once when the battery is exhausted, the user must find a power supply for their electronic device. If he is lucky enough, his charging device conforms with the local specification. But in most cases, the charging device is useless since the specifications are different.

Besides, each charging device has a preset input and output specifications. Accordingly, the DC output of the charging device can be used only by its slave electronic device and can not be used to supply another electronic device. For example, the charging device for a mobile phone can not be used on a shaver even if their terminal are same. If the voltage is too high for a certain electronic device, the winding or circuit inside will be burned; while if the voltage is too low, the electronic may not operate properly.

Nowadays, in order to meet the requirements from the market, some electronic devices may come incorporated with a power supply with a plug to conform to the local power supply requirements. By this arrangement, this appliance can be readily adapted with the local power supply. Nevertheless, this appliance belongs to an appliance with larger bulk size. The portable appliance is too small to incorporate with such a power supply. On the other hand, this power supply is designed for specific usage and can not be randomly changed for different applications. Furthermore, each power supply is incorporated with a specially designed plug which can not be used with another specification. In light of this, it is impossible for a traveler to bring multiple power supplies and/or charges having different plugs suitable for different applications.

In some cases, the appliance can be incorporated with a plug adapter to meet the local requirements if the their voltage requirements are all same. Nevertheless, this plug adapter works only in a few countries, but works all the time in these few countries. However, this plug adapter has a large bulk size and it is really inconvenient to always bring it. Even though the plug may suit the local socket, the voltage requirements may be different.

Since the GSM system is widely accepted around the world, it is possible to bring a mobile phone and communicate from country to country. Even each mobile phone is incorporated with a cartridge battery, with its limit service life, it shall be charged from time to time to ensure the proper function of the mobile phone. Accordingly, the traveler always charges its battery at hotel or restaurant. Nevertheless, if there is no suitable plug and charging device, the battery can not be charged and the mobile phone will be rendered uselessly once the power is exhausted.

SUMMARY OF THE INVENTION

It is the object of this invention to provide a multi-functional charging device wherein a plugging device is provided and which can be readily adapted for different socket of different specifications.

It is another object of this invention to provide a multi-functional charging device wherein the input voltage can be readily transformed by an electronic switching circuit to meet the input requirement of different appliances.

In order to achieve the object set forth, the multi-functional charging device made according to this invention generally comprises an upper housing and a lower housing. The lower housing is provided with an opening having an inner housing socket which is provided with a pair of conducting plates. Those conducting plates are electrically connected with an electronic switching circuit. The inner housing socket is further sleeved with a sliding socket. A biasing spring is disposed between the inner housing socket and the sliding socket. The side walls of the inner housing socket are provided with an circular cutout. The sides wall of the sliding housing is disposed with the half shaft seat and the opening of the lower housing is disposed with circular shaft seat. A pivoting hole is defined by the half shaft seat, the circular cutout and the circular shaft seat. The pivoting hole is disposed within the plugging device. The plugging device is provided with a contacting terminal. When the plugging device is set in an extended position, the plugging device may in contact with the conducting plates. By the movement of the sliding socket, the half shaft seat is separated from the circular cutout and the circular shaft seat. Accordingly, a different type of plugging device can be readily mounted and dismounted for specific application. Accordingly, the appliance can be supplied with power supply locally. Besides, the electric switching circuit can also transform the voltage into the applicable voltage.

DETAILED DESCRIPTION OF THE PREFERRED EMBODIMENT

Figure 1:
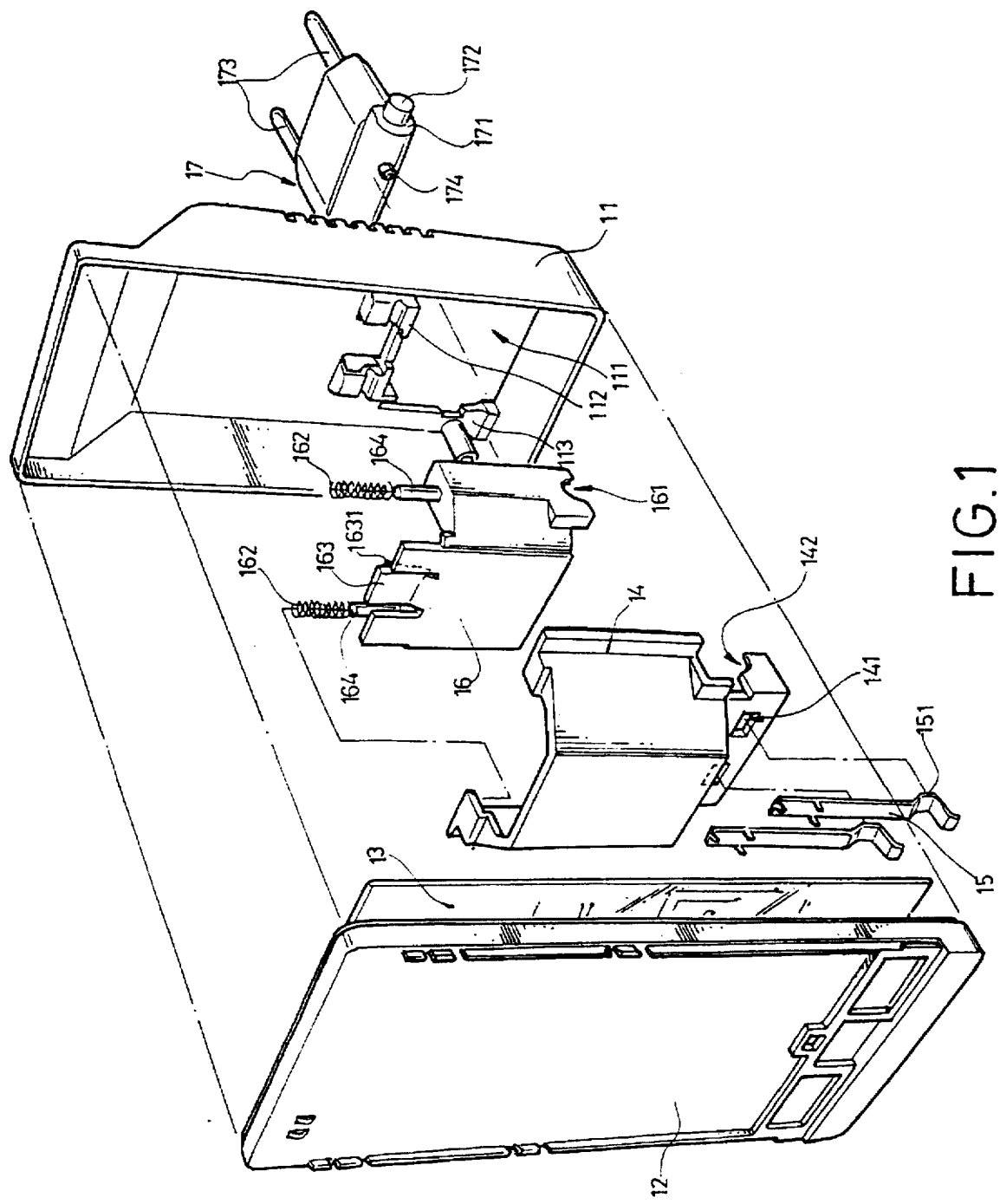
FIG. 1 is an exploded view of the multi-functional charging device system made according to this invention.
Figure 2:
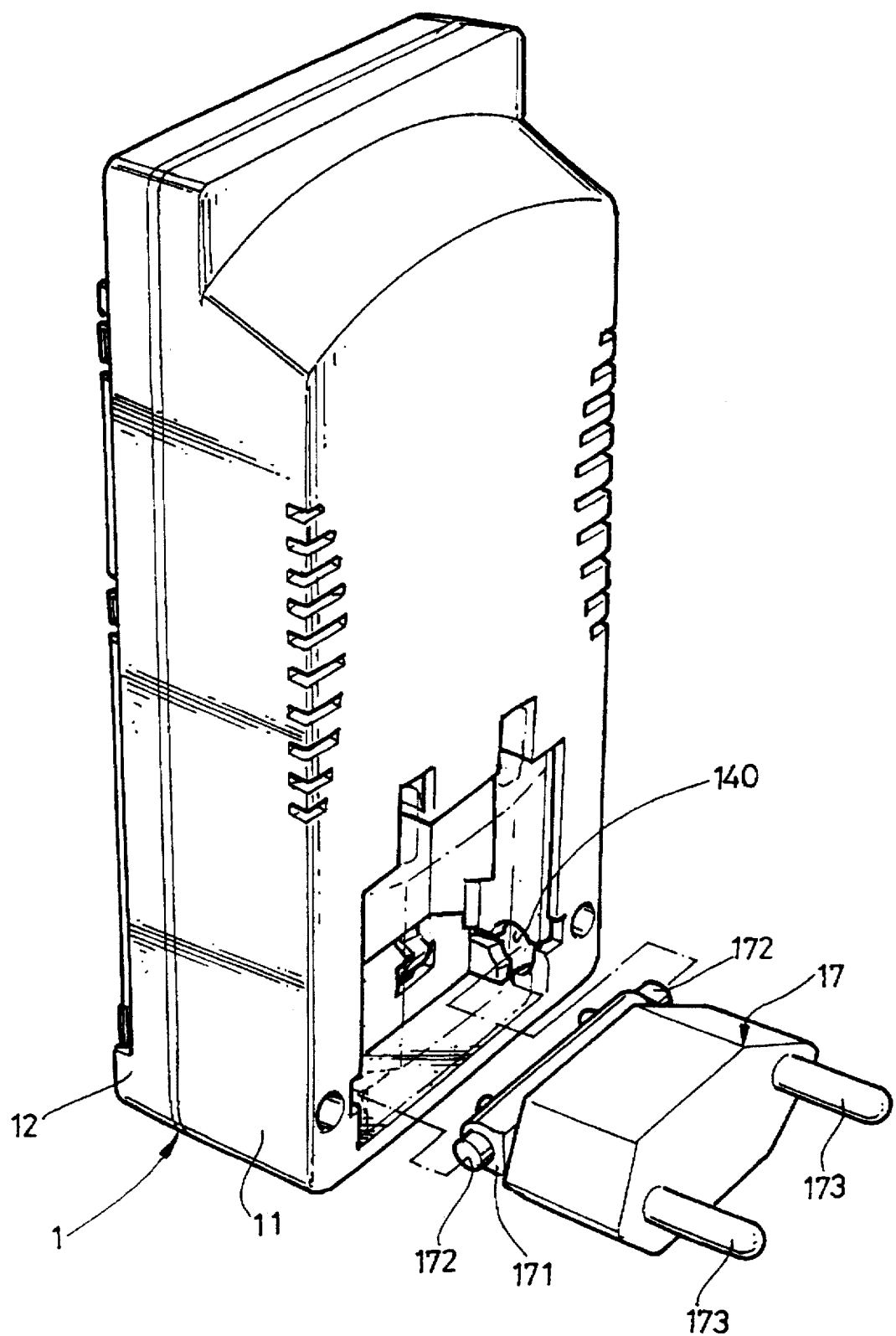
FIG. 2 is a perspective view oft he multi-functional charging device made according to this invention.

Referring to FIGS. 1 and 2, the multi-functional charging device generally comprises a housing 1 defining by a lower housing 11 and an upper housing 12. An electronic switching circuit 13 is disposed therein. One of a plurality of plugs 17 can be selected and installed onto the lower housing 11 according to a specific application.

The lower housing 11 is provided with an opening 111 at suitable location. The inner wall of the opening 111 is disposed with a projected socket 112. The front edge of the opening 111 is also disposed with a circular shaft seat 113. An inner housing socket 14 is disposed within the lower housing 11 corresponding to said opening 111. On the front panel of the inner housing socket 14 is disposed a pair of grooves 141 and a circular cutout 142 is disposed at the side wall of said inner housing socket 14.

A sliding socket 16 is disposed within the inner housing socket 14. A stud 164 is disposed at rear portion of the sliding socket 16. A coil spring 162 is disposed at the stud 164 which biases the inner wall of the inner housing socket 14 at one end. By this arrangement, the sliding socket 16 may move forward and backward. An elastic tab 163 declining slightly downward is disposed at rear middle portion of the sliding socket 16. A projected boss 1631 is disposed at the elastic tab 163. The projected boss 1631 is against the bottom of the projected socket 112 of the lower housing 11. The side wall at a front portion of the sliding housing 16 is disposed with a half shaft seat 161. A pivoting hole 140 is defined by the combination of the circular shaft seat 113 of the lower housing 11 and the circular cutout 142 of the inner housing socket 14.

A pair of conducting plates 15 is disposed at bottom of the inner housing socket 14. A curve portion 151 is disposed at front portion of the conducting plate 16 corresponding to the pivoting hole 140 of the inner housing socket 14. The conducting plate 15 is electrically connected to the electronic switching circuit.

The changeable plug 17 is configured a pair of conducting legs 173 disposed on a plastic housing 171. The plastic housing 171 is provided with a pair of projected shafts 172 at the rear portion. The projected shaft 172 can be received and installed at the pivoting hole 140 defining by the combination of the half shaft seat 161 of the sliding socket 16, circular socket 113 of the lower housing 11 and the circular cutout 142 of the inner housing socket 14. The conducting legs 173 are extended rearward and formed a pair of contacting terminals 174 at the plastic housing 171. The contacting terminals 170 may contact with the curve portion 151 of the conducting plates 15 when the plug 17 is installed and extended.

Figure 3:
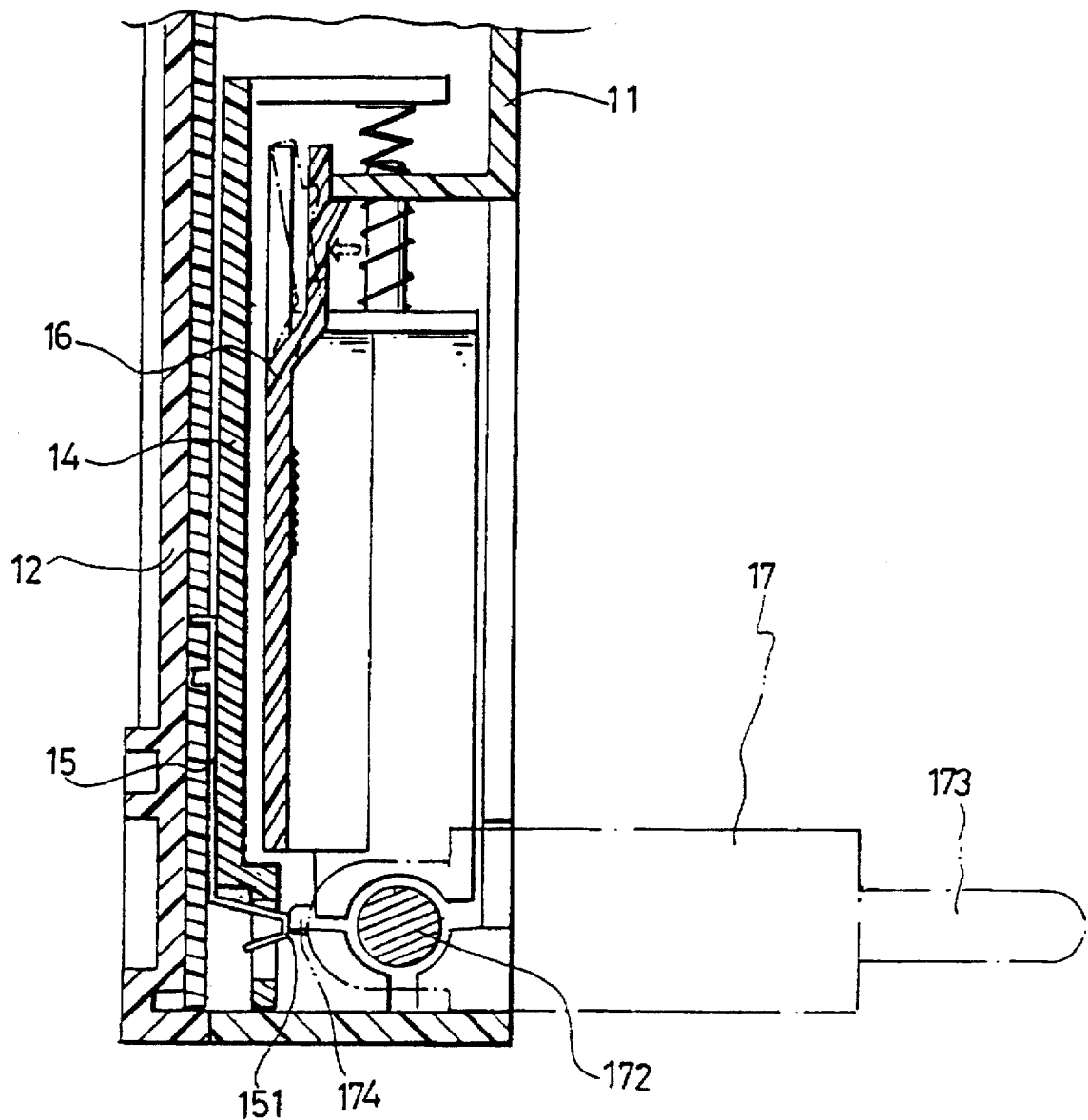
FIG. 3 is a cross sectional view of the multi-functional charging device made according to this invention.

As shown in FIG. 3, a selected plug 17 can be installed to the lower housing 11 by the engagement between the projected shaft 172 and the pivoting hole 142 defining by the combination of the half shaft seat 161 of the sliding socket 16, the circular socket 113 of the lower housing 11 and the circular cutout 142 of the inner housing socket 14. The lower housing 11 is provided with an opening 111 in such a manner that the plug 17 can be folded inward and stored within the housing 1. On the other hand, when the contacting terminals 174 of the plug 17 is extended outward, the contacting terminals 174 are in contact with the conducting plates 15. By this arrangement, the external AC source can be directed into the electronic switching circuit 13 through the conducting legs 173 and the conducting plates 15. The AC source is then transformed within the electronic switching circuit 13 and a DC output can be attained at the output of the charging device for different applications.

Figure 4:
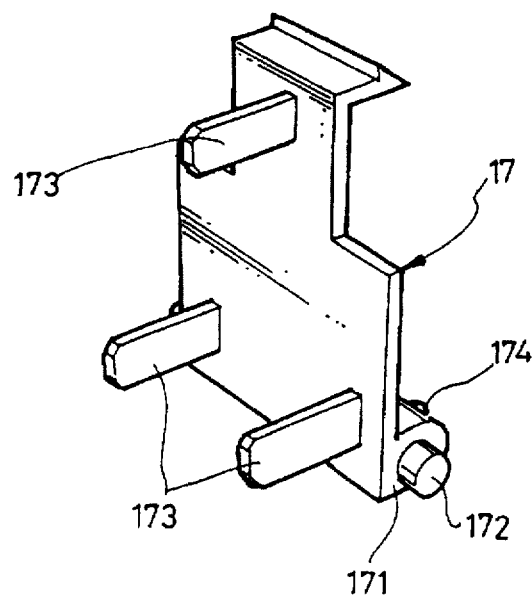
FIG. 4 is a perspective view showing another plugging device.
Figure 5:
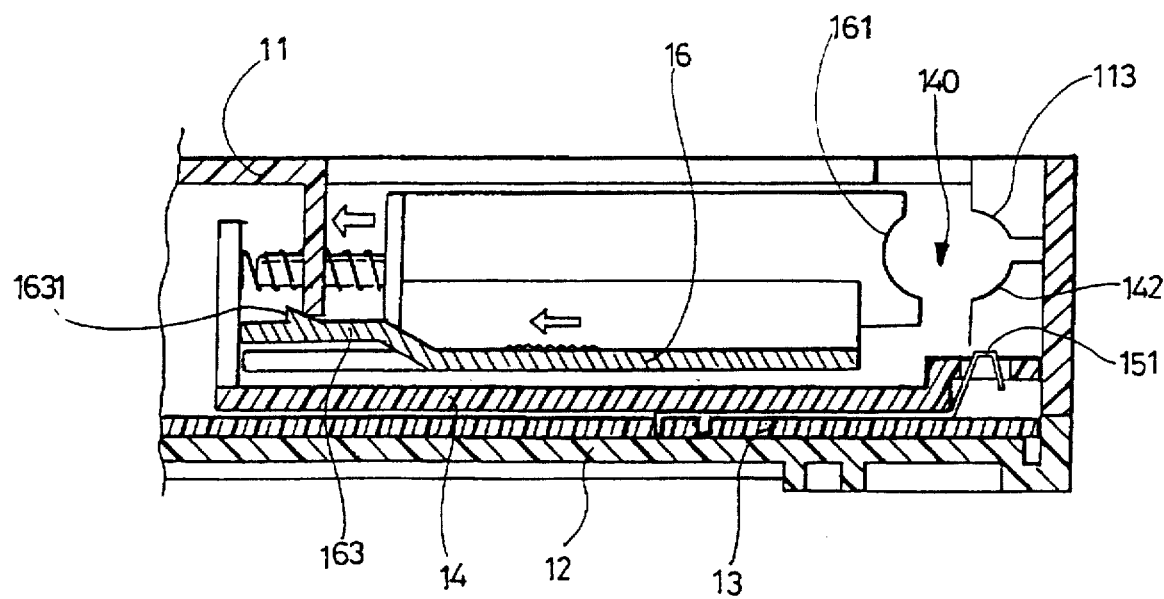
FIG. 5 is a sketch view showing the plugging device is removed therefrom.

There are different plug specifications in different countries. Accordingly, the conducting legs 173 of the plug 17 can be designed according to different specifications. As shown in FIG. 4, the plug 17 installed and stored at the housing 1 can be readily dismounted and installed with a suitable one. In dismounting, the plug 17 can be folded outward. Then the sliding socket 16 is moved in such a manner that the projected boss 1631 of the elastic tab 163 will be released from the projected socket 112 of the lower housing 11. Accordingly, the sliding socket 16 can be slidden inward in such a manner that the pivoting hole 142 defined by the combination of the half shaft seat 161 of the sliding socket 16, the circular socket 113 of the lower housing 11 and the circular cutout 142 of the inner housing socket 14 is set in a neutral position. Accordingly, the projected shaft 172 of the plug 17 can be readily removed therefrom. When the pivoting shaft 172 of a selected plug 17 is seated onto the circular cutout 142 of the inner housing socket 14, the sliding socket 16 is then released whereby the half shaft seat 161 may sleeve the pivoting shaft 172 of the plug 17. On the other hand, the circular cutout 142 and the circular shaft seat 113 may be aligned with each other. Since a coil spring 162 is disposed between the sliding housing 16 and the inner housing socket 14, the sliding housing 16 may resume to its original position as the external force exerted thereon is removed. When the sliding socket 16 is restored to its original position, the projected boss 1631 of the elastic tab 163 will engage with the projected socket 112 of the lower housing 11. Then the installation of a new selected plug 17 is completed. As shown in FIG. 5, the opening on the lower housing 11 matches the largest among the specifications. Accordingly, no matter which plug 17 is selected, it can be readily stored within the housing 1. The user can receive power for his portable appliance at any time and any place.

Since the plug 17 can be readily changed, accordingly, a suitable plug 17 can be readily selected according to different requirements in different countries. On the other hand, an electronic switching circuit 13 is also provided and no matter which kind of input voltage is connected, a suitable DC output can be attained by the charging device made according to this invention. As a result, the conventional problem can be readily solved by the provision of the present invention. On the other hand, the plug 17 is configured with a conducting legs 173 at a compact plastic housing 171, consequently, it can be readily stored and conveniently portable. The traveler can easily get instant power supply from the present invention.

On the other hand, the output terminal of the electronic switching circuit 13 can be connected with a charging socket of a mobile phone or charging socket of other appliances. In light of this, every kind of appliance can get power from the present invention.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A multi-functional charging device generally comprising a housing defining by a lower housing and an upper housing, an electronic switching circuit being disposed therein, wherein one of a plurality of plugs can be selected and installed onto the lower housing based on a specific application, characterized in that:

said lower housing being provided with an opening at suitable location, the inner wall of said opening being disposed with a projected socket, the front edge of said opening being also disposed with a circular shaft seat, an inner housing socket being disposed within said lower housing corresponding to said opening, the front panel of said inner housing socket being disposed a pair of grooves and a circular cutout being disposed at the side wall of said inner housing socket;

a sliding socket being disposed within said inner housing socket, a stud being disposed at rear portion of said sliding socket, a coil spring being sleeved onto said stud which biases the inner wall of said inner housing socket at one end in such a manner that said sliding socket may move to and fro, an elastic tab declining slightly downward is disposed at rear middle portion of said sliding socket, a projected boss being disposed at said elastic tab, said projected boss being against the bottom of the projected socket of said lower housing, the side wall at front portion of said sliding housing being disposed with a half shaft seat, a pivoting hole being defined by the combination of said circular shaft seat of said lower housing and said circular cutout of said inner housing socket;

a pair of conducting plates being disposed at bottom of said inner housing socket, a curve portion being disposed at front portion of said conducting plate corresponding to said pivoting hole of said inner housing socket, said conducting plate being electrically connected to said electronic switching circuit;

a changeable plug being configured a pair of conducting legs disposed on a plastic housing, said plastic housing being provided with a pair of projected shafts at rear portion, said projected shaft being received and installed within said pivoting hole defining by the combination of said half shaft seat of said sliding socket, said circular socket of said lower housing and said circular cutout of said inner housing socket, said conducting legs being extended rearward and formed a pair of contacting terminals at said plastic housing, said contacting terminals being contacted with said curve portion of said conducting plates when said plug is installed and extended.

* * * * *